(12) United States Patent
Gottfried

(10) Patent No.: US 8,295,820 B2
(45) Date of Patent: Oct. 23, 2012

(54) ADVANCED INTERNET-BASED CALLER ID INFORMATION/DATA FOR MOBILE PHONES AND MOBILE NETWORKS

(76) Inventor: Oter Gottfried, Kadima (IL)

( * ) Notice: Subject to any disclaimer, the term of this patent is extended or adjusted under 35 U.S.C. 154(b) by 180 days.

(21) Appl. No.: 12/503,138

(22) Filed: Jul. 15, 2009

(65) Prior Publication Data

US 2011/0014900 A1    Jan. 20, 2011

(51) Int. Cl.
*H04M 3/42* (2006.01)
*H04L 12/58* (2006.01)
*H04M 1/725* (2006.01)
*H04M 1/663* (2006.01)

(52) U.S. Cl. .................. 455/415; 455/412.1; 455/412.2

(58) Field of Classification Search .... 455/412.1–412.2, 455/415

See application file for complete search history.

(56) References Cited

U.S. PATENT DOCUMENTS

| 6,978,127 | B1 * | 12/2005 | Bulthuis et al. | ............ 455/412.1 |
| 2006/0782086 | | 2/2003 | Clapper | |
| 2004/0062374 | A1 | 4/2004 | Lund | |
| 2004/0067751 | A1 | 4/2004 | Vandermeijden | |
| 2004/0137884 | A1 * | 7/2004 | Engstrom et al. | .......... 455/414.1 |
| 2005/0084084 | A1 * | 4/2005 | Cook et al. | ............... 379/142.01 |
| 2005/0232247 | A1 | 10/2005 | Whitley | |
| 2006/0073817 | A1 * | 4/2006 | Lee | ............................... 455/417 |

FOREIGN PATENT DOCUMENTS

| WO | WO03061244 | 7/2003 |
| WO | WO03073732 | 9/2003 |
| WO | WO2006024952 | 3/2006 |

* cited by examiner

*Primary Examiner* — Jean Gelin
*Assistant Examiner* — Munsoon Choo
(74) *Attorney, Agent, or Firm* — Law Offices of Edward Langer Adv. and Patent Attorney

(57) ABSTRACT

A method to implement CID enhancement performed by mobile phone software, running on a user/subscriber's mobile phone, in communication with a response server of a Website during an incoming call. The method includes alerting the Website by transmission of an initiation command from the mobile phone upon receipt of the incoming call, extracting the caller number from the phone ringing feature of the mobile phone, connecting the mobile phone over the Internet to the response server and responding to the initiation command, such that the caller's ID is displayed with said relevant caller information and said other caller data in real time, and is provided within the few seconds elapsed before the user/subscriber answers the phone call.

18 Claims, 4 Drawing Sheets

ADVANCED INTERNET-BASED CALLER ID INFORMATION/DATA FOR MOBILE PHONES AND MOBILE NETWORKS

FIELD OF THE INVENTION

The present invention generally relates to mobile phone technology, and more particularly to a system and a method to enable mobile phones to display information on the phone screen regarding the caller.

BACKGROUND OF THE INVENTION

Cook, et al, in US Pat. Applic. No. 20050084084, Caller Identification Employing a Digital Content Set, filed Oct. 17, 2003, describe the prior art. In a telephone system, a caller can establish a connection to a called party. Originally, a telephone system did not identify the caller to the called party. In order to know the identity of the caller, the called party had no option other than answering the call. This had the disadvantage of not allowing the called party to decide whether to take the call. The called party in some circumstances might not want to take the call. In addition, the called party may not be prepared to talk to the caller, and there may be delay or confusion at the beginning of the conversation as the called party establishes the identity of the caller.

An improvement in the prior art is caller ID. In a caller ID system, the telephone system identifies the caller, and provides the caller's identification (CID) to the called party. The caller's identification includes the caller's telephone number, and can additionally include an account holder name, a company name, etc., that is registered to that telephone number. The caller's identification is displayed on the called party's telephone or on a connected caller ID unit. This is an improvement, as it allows the called party to likely identify the caller, and may allow the called party to mentally prepare for the conversation.

However, the caller ID system of the prior art also has disadvantages. The caller ID system merely provides the caller's registered identification to the called party. The called party may not be able to identify the caller from registered caller information, such as in the case of a call from an unknown person. The caller may still be relatively anonymous. In addition, the telephone number provided by caller ID merely identifies telephone owner's name, i.e., the account holder's name, and the telephone device used to make the call, and does not identify the actual caller if the actual caller is different than the telephone owner.

Furthermore, the prior art caller ID system cannot be controlled or configured by the caller, except that the caller can choose to disable the caller ID function. Moreover, the prior art caller ID system cannot provide personalized or flexible identification information.

Thus, it would be advantageous to provide a caller ID system where the caller's ID included an expanded set of identifying information, and other add on data, in real time, and where the information was provided within the few seconds elapsed before the called party answers the phone call, where the system is appropriate for a mobile network.

SUMMARY OF THE INVENTION

Accordingly, it is a principal object of the present invention to provide a system to display information on a user/subscriber's mobile phone that is receiving a call, where the information includes the caller's identification (CID), such as name and address.

A method to implement CID enhancement performed by mobile phone software, running on a user/subscriber's mobile phone, in communication with a response server of a Website during an incoming call. The method includes alerting the Website by transmission of an initiation command from the mobile phone upon receipt of the incoming call, extracting the caller number from the phone ringing feature of the mobile phone, connecting the mobile phone over the Internet to the response server and responding to the initiation command.

Responding includes searching for relevant caller information associated with the caller number, optionally configuring and adding to the relevant caller information other data including an advertisement and other caller data including location alias and picture. Responding also includes sending both the relevant caller information and the other caller data to the mobile phone and displaying both the relevant caller information and the other caller data on the mobile phone, such that the caller's ID is displayed with the relevant caller information and the other caller data in real time, and is provided within the few seconds elapsed before the user/subscriber answers the phone call.

The basis of the present invention is dedicated mobile phone software (SW) that is provided by a proprietary Website, for example, to run on a variety of mobile phone models. Upon receiving an incoming call alert, the mobile phone SW will take the caller number from the phone ringing feature, connect via IP protocol over the Internet to a server of the present invention, search for relevant information about this caller based on his number, add to it various other data such as advertisement, location, alias, picture or any other format of data and send it back to the mobile phone for display by the proprietary mobile phone SW.

This communication back and forth from the server will be configured especially for fast transaction of a few seconds in order to fit the mobile world data networks and the short time before the called user will answer.

The mobile phone SW will be adaptable to a few different mobile phone technologies such as: Symbian, BREW, J2ME and others.

The server SW can be based at any Internet site, controlling the communication to multiple phones in parallel. It will perform the search for the caller profile over a data base, and will be able to get the caller data from his Internet published information such as Messenger Profile & Status as configured by MSN Messenger or others, or Face book or others. The Server SW will also connect to other servers that can add more information for retrieval by this search, such as advertisement, location and any other information relevant to the caller number. The server SW can run Java or any other technology.

Two modes of operation are used:

Simple Flow Mode:

User gets an incoming phone call with Number (CID), the phone connects to the server and the server initiates a reverse look up and displays the caller profile based on his published network information or internal database listing, similar to Messenger Status™.

The display will be simple text and icons of a few rows

Advanced Mode:

Simple mode PLUS larger graphic display that can be the user enhanced profile and/or a real Advertisement with graphics on every incoming call.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
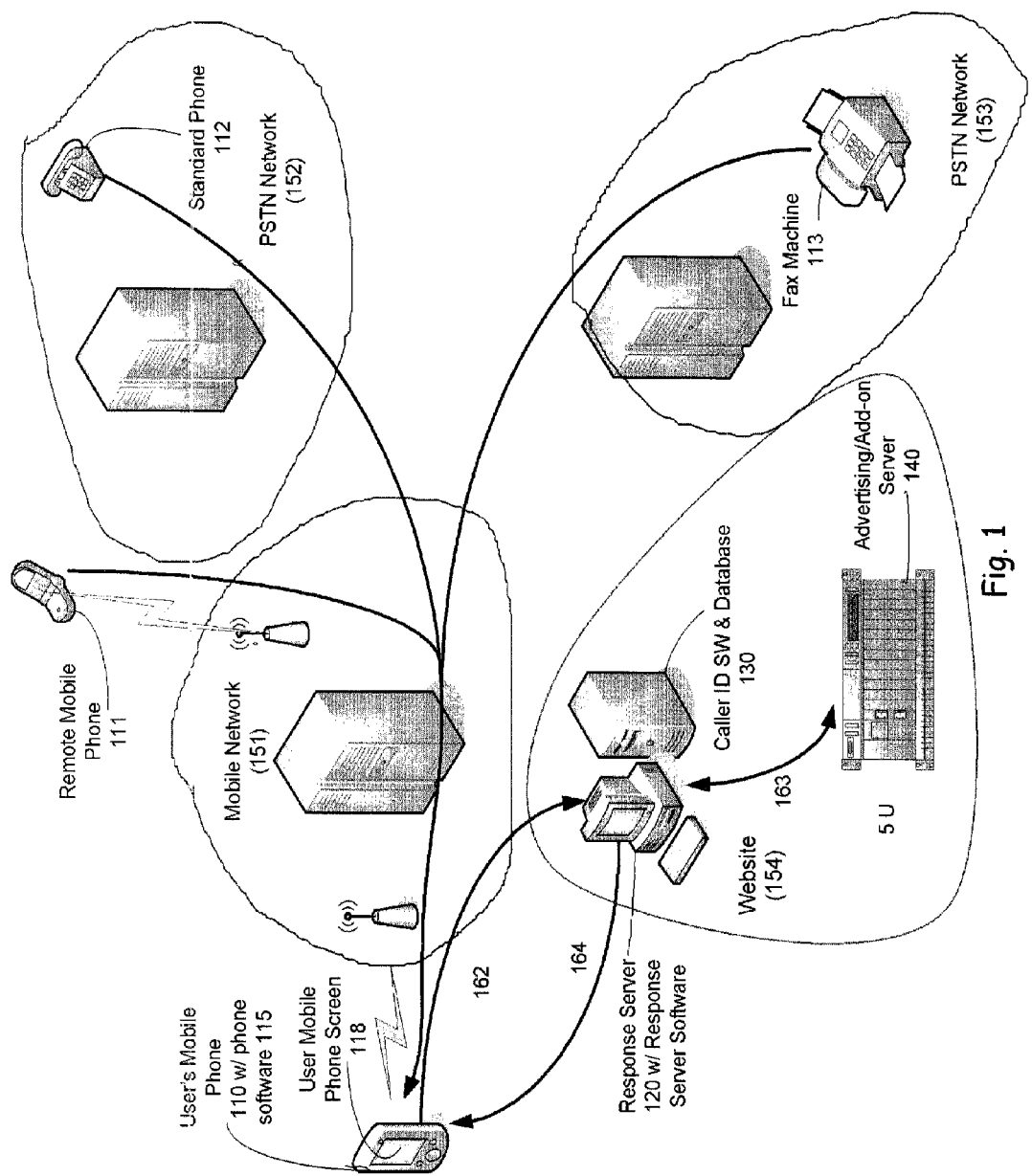
FIG. 1 is a schematic illustration of the advanced flow, performed according to the principles of the present invention.

FIG. 1 is a schematic illustration of the advanced flow, performed according to the principles of the present invention. The Mobile Phone software (SW) 115 of the User Mobile Phone 110 will be "always on" and hold an open IP connection to the Response Server 120 with Keep Alive capabilities. As an incoming call arrives at User's Mobile Phone 110 from remote Mobile Phone 111 in Mobile Phone Network 151, Standard Phone 112 in PSTN Network 152 or Fax 113 in PSTN Network 153, Mobile Phone SW 115 will send the Caller ID (CID) number and the called ID to Response Server 120 via link 162.

Response Server 120 at Website 154 retrieves the CID information from the Data Base 130, also at Website 154, and according to the called ID retrieves the CID information corresponding to the CID. Response Server 120 also retrieves an advertisement waiting for this user or any add-on data available from the Advertising/Add-on Server 140 via link 163, all within Website 154. The CID profile and advertisement will be configured in an optimized format for fast transmission and display on the phone screen 118. It will be sent as file format or bitmap, or just a description for the mobile software to draw on the phone screen. Alternatively, the add-on data may be sent as a WAP/Web link, enabling the user to click and go to a WAP/Web page.

Response Server 120 will send the CID profile and ad to User Mobile Phone 110 via link 164. User Mobile Phone 110 will display the CID profile and the ad during the call session until the "End" button is pressed. The End button is a configurable option that stays on the screen until closed by the user. This call information with the advertisement will be stored on user mobile phone 110 for the previous X incoming calls, in a cyclic procedure based on the phone's capabilities. Response Server 120 is configured to store the user incoming call history for a longer period.

Figure 2:
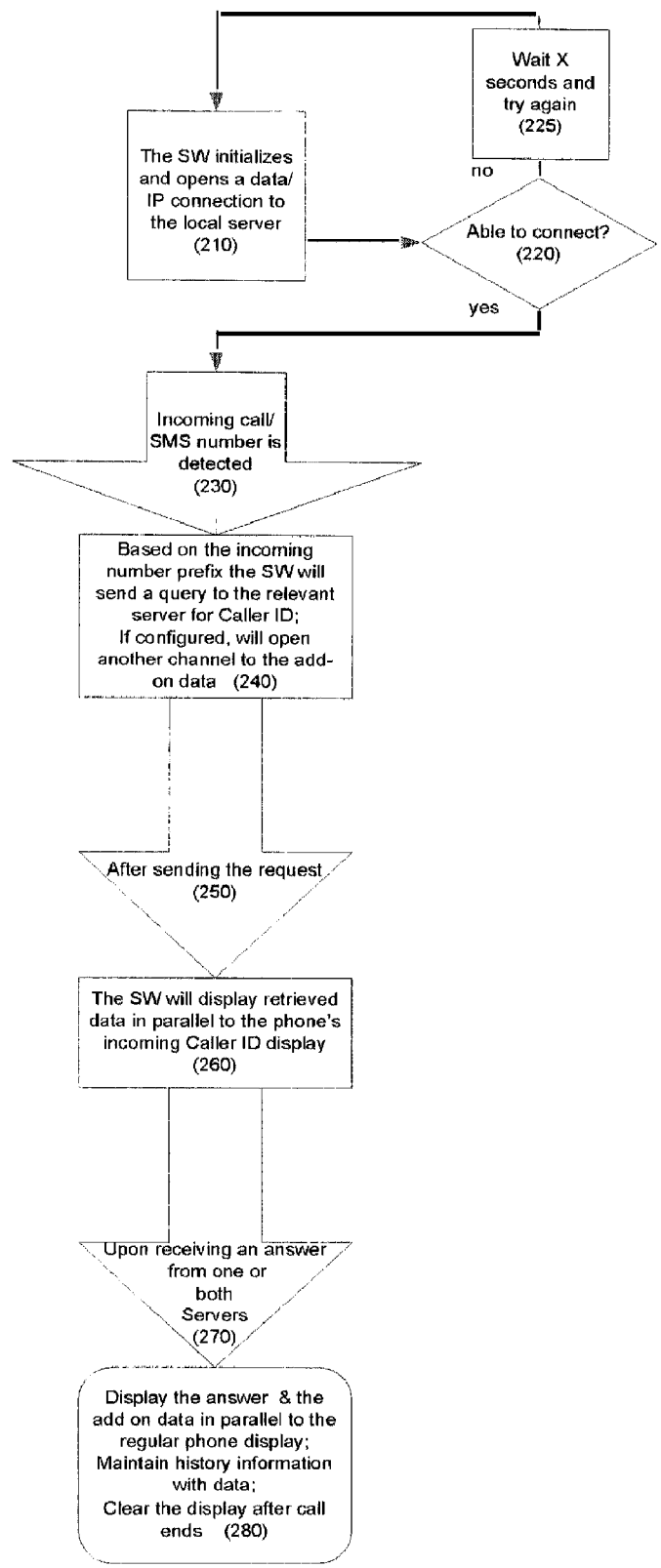
FIG. 2 is a mobile software generic flow chart, performed according to the principles of the present invention.

FIG. 2 is a mobile software generic flow chart, performed according to the principles of the present invention. The SW initializes and opens a data/IP connection to the local server in step 210. If it is not able to connect in step 220, then it waits X seconds and tries again in step 225. If it is able to connect in step 220, then the incoming call/SMS number is detected in step 230. Based on the incoming number prefix, the software will send a query to the relevant server for the Caller ID. The software (SW) enables the system to do its job.

If add-on data is configured, the SW will open another channel in parallel to link 164 of FIG. 1 for the add-on data in step 240. After sending the request in step 250, the software will display retrieved data in parallel to the phone's incoming Caller ID display in step 260. Upon receiving an answer from one or both servers in step 270, the SW will display the answer and the add-on data in parallel to the regular phone display. The SW will also maintain history information with the data and clear the display after the call ends in step 280.

An alternative embodiment uses one or more additional servers per prefix and another server for the add-on data. Everything can also be on the same server. If multiple servers are configured, the information may or may not be displayed in parallel.

Figure 3:
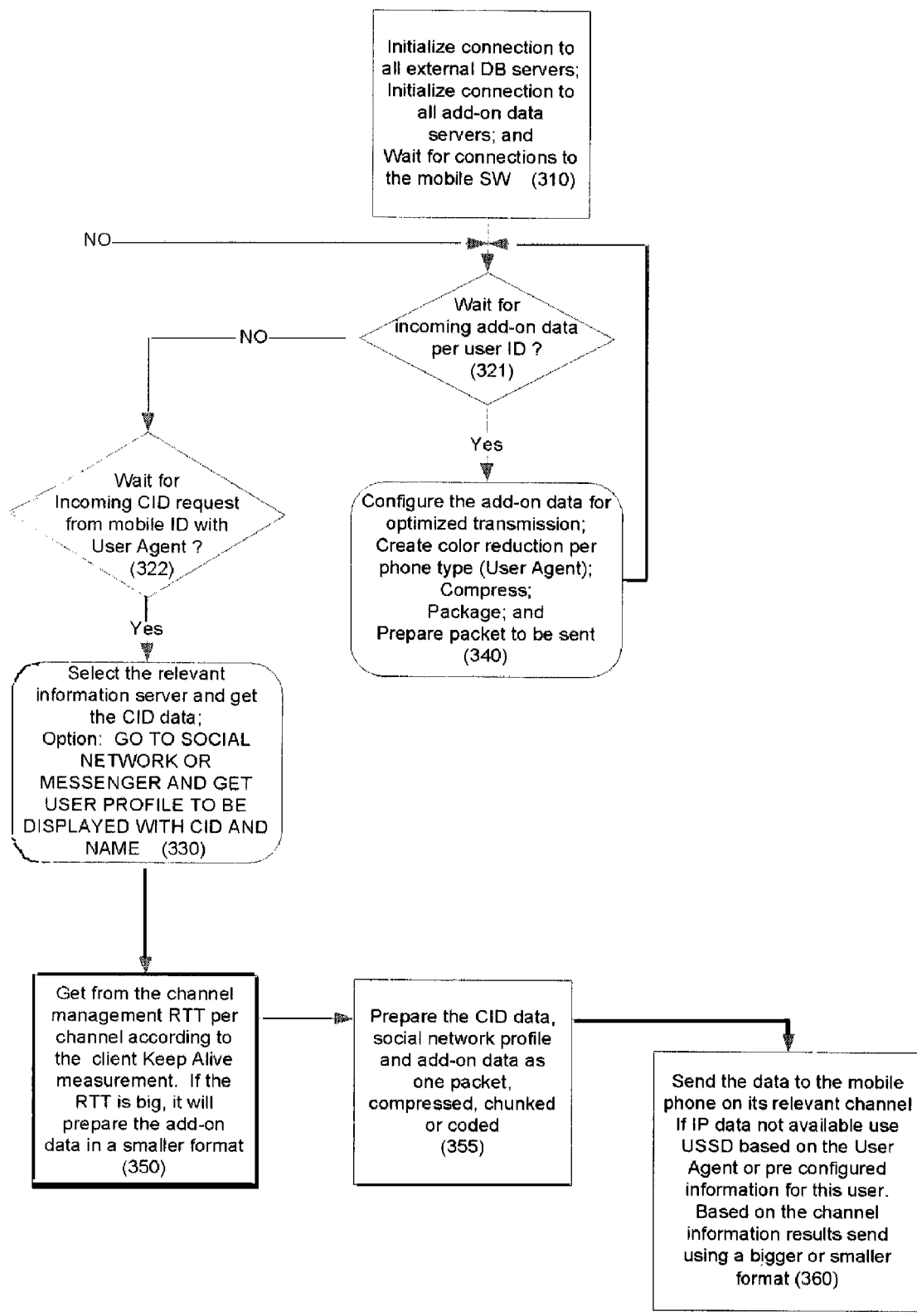
FIG. 3 is a general flow chart, performed according to the principles of the present invention.

FIG. 3 is a general flow chart describing the operation of the server software, performed according to the principles of the present invention. The server is a dedicated server, and may or may not be a Web server. First, connections to all external DB servers are initialized. Then, connections to all add-on data servers are initialized. Then the SW waits for connections to the mobile phone SW in step 310. While the SW is waiting for incoming add-on data corresponding to the user ID 321, the SW configures the add-on data for optimized transmission, creates color reduction per phone type (User Agent) and compresses, packages and prepares the packet to be sent 340.

If the SW is not waiting in step 321, then, if the SW is waiting for an incoming CID request from the mobile ID with the User Agent in step 322, then the SW selects the relevant information server and gets the CID data. Optionally, the SW can go to a social network or messenger and get a user profile to be displayed with the CID and name 330. If the incoming source in step 320 is the incoming CID request from the mobile ID with a User Agent in step 321, the SW selects the relevant information server and gets the ID data. Optionally, the SW goes to a social network or messenger and gets a user profile to be displayed with the CID and name in step 330.

The data can also be on a single server, even without additional servers. Then get the RTT per channel from the channel management, according to the client Keep Alive measurement. If the RTT is big, it will prepare the add-on data in a smaller format 350. Then prepare the CID data, social network profile and add-on data as one packet, compressed, chunked or coded in step 355. Finally, the SW sends the data to the mobile phone on its relevant channel. If IP data is not available use USSD based on the User Agent or pre-configured information for this user, Based on the channel information results the SW sends the data using a bigger or smaller format in step 360.

Then, for either incoming source in step 320, the per-client channel management will measure the round-trip-time (RTT) per channel. If the RTT is big it will only send a small amount of data and add on data, if any, in order to compensate in step 355 and assure real-time results for the caller ID. Then send the data to the mobile phone on its relevant channel. A 3G channel will have an IP connection. A 2.5G channel will close the close IP connection during the voice conversation and thus will use the Unstructured Supplementary Services Data (USSD). If IP data is not available, use USSD based on the User Agent or pre-configured information for this user. Based on the channel information results, it will send a bigger or smaller amount of data, as described above in step 360. USSD sends text between a Mobile Station and an application program.

The server will hold the add-on data with three formats: High, Medium or Low resolution. The resolution will be based on the phone type, i.e. the user equipment (UE) and the RTT (Round Trip Time). E.g., for high RTT the low resolution will be used. The server will hold the add-on data with three formats: High, Medium, Low resolution.

In addition, to shorten the time to display results to the user, the mobile phone software can open a few User Datagram Protocol (UDP) or Transmission Control Protocol (TCP) connections. The server will use those connections for sending the data in parallel to reduce the time. For example, it will use one connection for the add-on data and the other for the caller ID results. TCP is typically used by applications that require guaranteed delivery. It is a sliding window protocol that provides handling for both timeouts and retransmissions. The UDP offers only a minimal transport service, non-guaranteed datagram delivery, and gives applications direct access to the datagram service of the IP layer. UDP is used by applications that do not require the level of service of TCP or that wish to use communications services, e.g., multicast or broadcast delivery not available from TCP.

Figure 4:
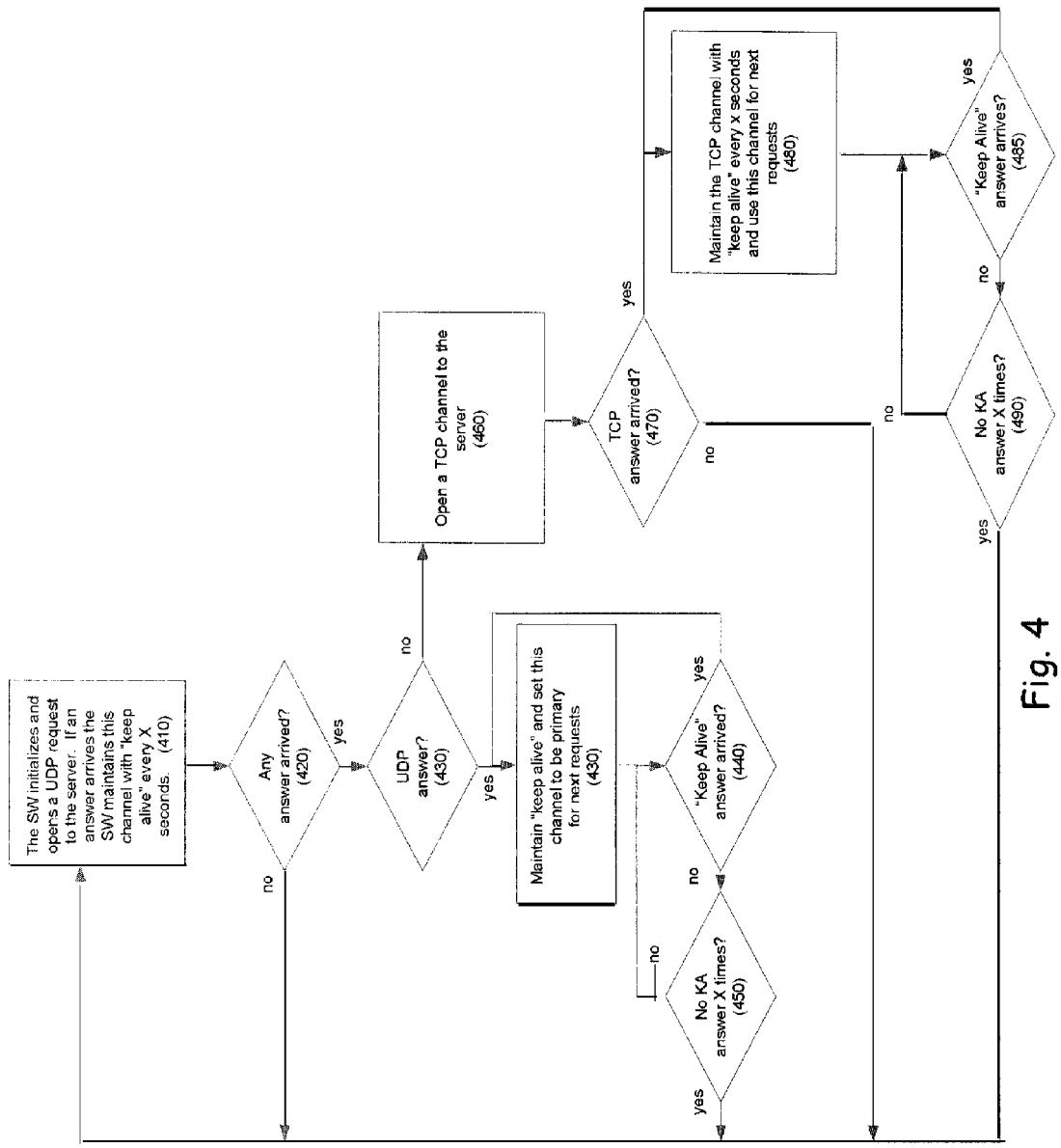
FIG. 4 is a flow chart of mobile software transmission channel operation, performed according to the principles of the present invention.

FIG. 4 is a flow chart of mobile software transmission channel operation, performed according to the principles of the present invention. The SW initializes and opens a UDP request to the server. If an answer arrives the SW maintains this channel with "keep alive" (KA) every X seconds in step 410. The SW checks to see if any answer has arrived in step 420. The SW checks to see if a UDP answer has arrived in step 430. If a UDP answer has arrived, the SW maintains the "keep alive" status and sets this channel to be primary for next requests in step 430.

The SW checks the "keep alive" status to see if an answer has arrived in step 440. If not, the SW repeats the KA answer X times in step 450. If there is no UDP answer in step 430, the SW opens a TCP channel to the server in step 460. Then, the SW checks to see if a TCP answer has arrived in step 470. If so, the SW maintains the TCP channel with "keep alive" every x seconds and uses this channel for next requests in step 480. The SW checks if the "keep alive" answer has arrived in step 485, and if not, the SW repeats the KA answer X times in step 490.

Unique Enhancements of the Innovation:
I. Global:
1. Real time, i.e., fast response to Advanced Caller ID requests by the mobile phone AND fast retrieval of the add-on data, such as an advertisement.
2. Ability to display caller ID data on the mobile phone before the user answers the call.
3. The most practical configuration for mobile networks and devices!!
4. This solution can support 3G and 2G devices and networks.
II. Client SW Side:
 1. The Client SW opens a UDP connection to the server with fall back to TCP.
 2. The connection will be maintained by a "Keep Alive" mechanism.
 3. The client connection is "always on" for fast communication.
 4. The client opens a few connections to the server for faster data transfer over the network.
 5. The mobile phone SW will open connections to a few servers.
 6. The mobile SW also connects to USSD protocol in specific devices.
 7. The mobile SW sends its type (User Agent) to the server over the IP channel.
 8. The mobile phone database is optional.
III. Server SW Side:
 1. The server SW will be connected to various sources of Advanced Caller ID.
 2. The server SW will be connected to various sources of add-on data, such as Advertisements, Messengers, Social Networks, etc.
 3. The server SW will prepare the add-on data in optimized, compressed format.
 4. The server SW will prepare the add-on data with three formats for small, medium and high resolution.
 5. The server SW will measure and record the Round Trip Time (RTT) of every mobile device connection based on the "keep alive" signal.
 6. Based on the Phone type (User Agent) and the RTT the server will select which answer format to give the mobile phone.
 7. If IP data channel is not available for the answer to the mobile phone it will use SMS or USSD channels.
 8. The server splits the data sent to the mobile phone on all the open channels to this mobile device for fast data transfer over the mobile network.
 9. The add-on data can be changed by the user or connected from the user social network profile.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A system to implement and display on a phone screen, rapid caller ID (CID) enhancement during an incoming call by performing a search for the caller profile over a database and over the caller's relevant Internet published information based on the caller's identity provided by at least one of phone number, username and email address, utilized as the search key and by constantly connecting to any external server that can add more updated information for immediate retrieval by this search, said system comprising:

an adaptable mobile phone software (SW) provided by a website and capable of running on a variety of user/subscriber's mobile phone technologies, configured especially for fast transactions of a few seconds before the called user will answer;

an advertising/add-on server for configuring an advertisement in an optimized format for fast transmission and display on the phone screen, wherein said advertisement will be sent as at least one of a file format, bitmap and drawing description and wherein add-on data sent as a WAP/Web link enables the user to click and go to a WAP/Web page, configured especially for fast transaction;

a response server, which can be based at any Internet Website, said response server connecting to the mobile phone by said SW, wherein said SW, upon receiving an incoming call alert, takes the caller number from the phone ringing feature, and providing said connection via IP protocol over the Internet to said response server for performing a search for the caller profile over a database or over the caller's relevant Internet published information based on the caller's ID utilized as the search key, and by constantly connecting to any other server, under the control of said response server, that can add more updated information for retrieval by this search, so as to maintain said more updated information constantly available, wherein the connection is made fast by:
opening at least one of UDP and TCP connections to said response server and the add-ons on said server in advance before the call is answered;
maintaining this connection with keep alive;
preparing said add-on data in an optimized/compressed format, resulting in its rapid transportation over the Internet for easy and fast display on the phone screen;
pre-fetching the add-on data every few minutes in order to have it ready for fast delivery to the phone, in the manner of data-caching;
maintaining data on the speed level of the connection to each device by measuring the round trip time (RTT) and based on that, using at least one of three resolution formats such as a high resolution data format, medium resolution data format and low resolution data format for fast delivery based on the user connection and user device;
opening a plurality of parallel connections to the device in order to get parallel delivery of the content, resulting in the user seeing it faster;
configuring, while the SW is waiting for incoming add-on data corresponding to the user ID, the add-on data by the SW for optimized transmission,
creating color reduction per phone type (User Agent); and
compressing, packaging and preparing the packets to be sent,
wherein said search is constantly being updated data and when said mobile phone has an incoming call it can get said data immediately as it is constantly available,
resulting in the caller's ID being displayed with other retrieved caller data in real-time, and wherein the retrieved data is provided within the few seconds elapsed before the user/subscriber answers the phone call.

2. The system of claim 1, wherein said advertising add-on server is located at the Website.

3. The system of claim 1, wherein said SW can control the communication to multiple phones in parallel.

4. The system of claim 1, further comprising a database, wherein the SW performs the search for the caller profile over said data base.

5. A method to implement and display on a phone screen, rapid caller ID (CID) enhancement during an incoming call by performing a search for the caller profile over a database and over the caller's relevant Internet published information based on the caller's identity provided by at least one of phone number, username and email address, utilized as the search key and by constantly connecting to any external server that can add more updated information for immediate retrieval by this search, said method comprising:
providing an adaptable mobile phone software (SW) provided by a website and capable of running on a variety of user/subscriber's mobile phone technologies, configured especially for fast transactions of a few seconds before the called user will answer;
providing an advertising/add-on server for configuring an advertisement in an optimized format for fast transmission and display on the phone screen, wherein said advertisement will be sent as at least one of a file format, bitmap and drawing description and wherein add-on data sent as a WAP/Web link enables the user to click and go to a WAP/Web page, configured especially for fast transaction; and
providing a response server, which can be based at any Internet Website, said response server connecting to the mobile phone by said SW, wherein said SW, upon receiving an incoming call alert, takes the caller number from the phone ringing feature, and provides said connection via IP protocol over the Internet to said response server for performing a search for the caller profile over a database or over the caller's relevant Internet published information based on the caller's ID utilized as the search key, and by constantly connecting to any other server, under the control of said response server, that can add more updated information for retrieval by this search, so as to maintain said more updated information constantly available, wherein the connection is made fast by:
Opening at least one of UDP and TCP connections to said response server and the add-ons on said server in advance before the call is answered;
Maintaining this connection with keep alive;
Pre-paring said add-on data in an optimized/compressed format, resulting in, it will be rapidly transported over the Internet for easy and fast display on the phone screen;
Pre-fetching the add-on data every few minutes in order to have it ready for fast delivery to the phone, in the manner of data-caching;
Maintaining data on the speed level of the connection to each device by measuring the round trip time (RTT) and based on that, using at least one of three resolution formats such as a high resolution data format, medium resolution data format and low resolution data format for fast delivery based on the user connection and user device;
Opening a plurality of parallel connections to the device in order to get parallel delivery of the content, resulting in the user will see it faster;
Configuring, while the SW is waiting for incoming add-on data corresponding to the user ID, the add-on data by the SW for optimized transmission,
Creating color reduction per phone type (User Agent);
Compressing, packaging and preparing the packets to be sent,
Wherein said search is constantly being updated data and when said mobile phone has an incoming call it can get said data immediately as it is constantly available, resulting in the caller's ID is displayed with other retrieved caller data in real-time, and wherein the retrieved data is provided within the few seconds elapsed before the user/subscriber answers the phone call.

6. The method of claim 5, wherein said SW prepares said other caller data in advance and in optimized compressed format specifically and uniquely for every phone type for fast delivery and display.

7. The method of claim 5, wherein said searching comprises accessing at least one of a social network and messenger to retrieve user profile information to be displayed with the CID and caller name.

8. The method of claim 5, wherein said other caller data may be sent as a WAP/Web link, enabling the user/subscriber to click and go to a WAP/Web page.

9. The method of claim 5, wherein said communication back and forth from the server is configured especially for a fast transaction of a few seconds in order to fit the mobile world data networks, characterized by a short time period before the called user/subscriber will answer.

10. The method of claim 5, further comprising pressing an "End" button by the user/subscriber to terminate said displaying of both said relevant caller information and said other caller data on the mobile phone of the user/subscriber.

11. The method of claim 5, further comprising storing said relevant caller information with said other caller data on the user/subscriber's mobile phone for a previously specified number of incoming calls, in a cyclic procedure based on the phone's capabilities.

12. The method of claim 5, further comprising storing said relevant caller information with said other caller data on the response server, wherein the response server is configured to store the user/subscriber incoming call history for a longer period than said storage on the mobile phone.

13. The method of claim 5, wherein said connecting the mobile phone over the Internet to the response server of the Website, further comprises initializing and opening by the SW of a data/IP connection to the response server.

14. The method of claim 5, further comprising waiting a specified number of seconds by the SW, and trying again if it is not able to connect a first time.

15. The method of claim 5, further comprising detecting the incoming call/SMS number by the SW.

16. The method of claim 5, further comprising sending a query by the SW to the response server for the Caller ID based on said caller number prefix.

17. The method of claim 5, wherein if said other caller data is configured, further comprising opening another channel in parallel to said connection between the mobile phone and the response server.

18. The method of claim 5, further comprising after sending said query, displaying said other caller data in parallel to the mobile phone's incoming CID display.

\* \* \* \* \*